F. F. SKEEL.
METERING ELECTRICAL DISTRIBUTION SYSTEM INCLUDING A METERING PANEL BOARD.
APPLICATION FILED AUG. 7, 1905.
987,650.
Patented Mar. 21, 1911.
2 SHEETS—SHEET 1.
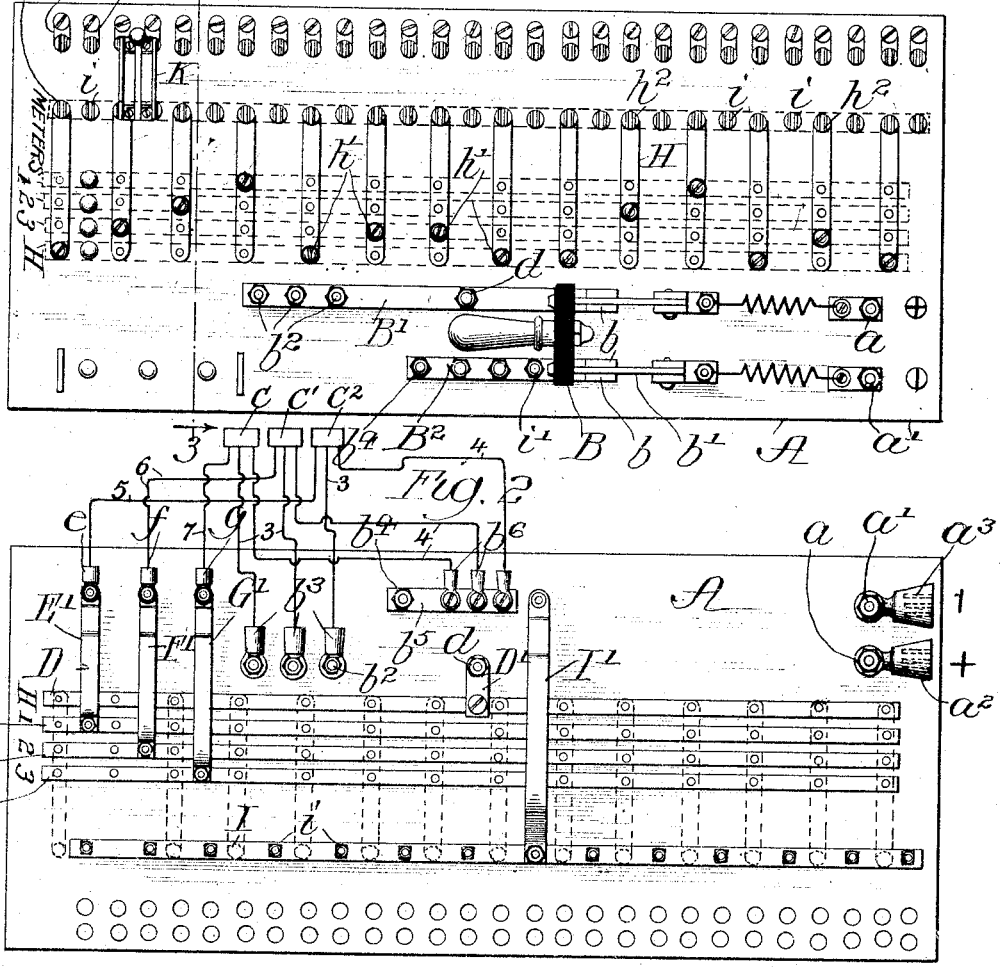
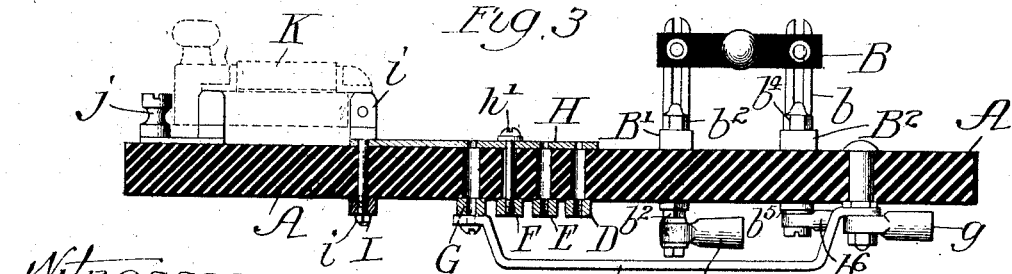
Witnesses:
H. G. Barrett
C. R. Wilkins
Inventor:
Frederick F. Skeel
by Poole & Brown
his Attys

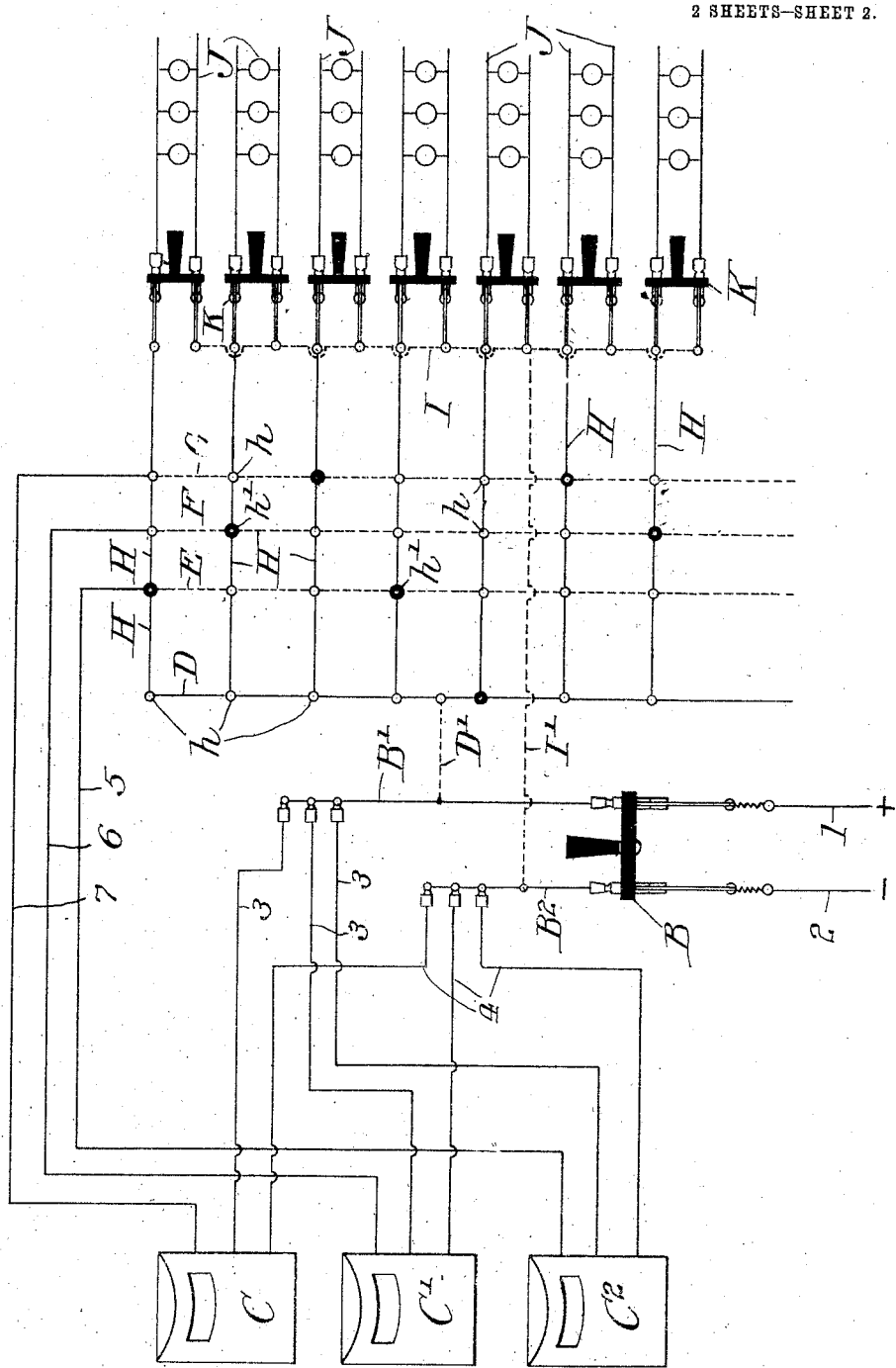

UNITED STATES PATENT OFFICE.

FREDERICK F. SKEEL, OF CHICAGO, ILLINOIS.

METERING ELECTRICAL DISTRIBUTION SYSTEM INCLUDING A METERING PANEL-BOARD.

987,650.

Specification of Letters Patent. Patented Mar. 21, 1911.

Application filed August 7, 1905. Serial No. 273,080.

*To all whom it may concern:*

Be it known that I, FREDERICK F. SKEEL, a citizen of the United States, residing at Chicago, in the county of Cook and State of Illinois, have invented a certain new and useful Metering Electrical Distribution System Including a Metering Panel-Board, of which the following is a specification.

This invention relates to metering electrical distribution systems and is designed to provide an organization and apparatus which is particularly simple and compact, and which will admit of changes being made in the connections between the load circuits and the meters without disturbing the permanent connections, and with a minimum of effort and rearrangement of parts.

In installing electrical systems in buildings it is customary to provide a load circuit individual to each room or suite to be occupied by a single tenant, and to provide an individual meter therefor. It is also customary to lead all of the load circuits in the building, or in a certain section thereof, as for instance a single floor, from a central station which is in circuit with suitable supply mains; the current being branched at said station and distributed to the several load circuits.

In the initial installation it is customary to provide a separate meter for each load circuit, but after the building is occupied it frequently occurs that a single tenant will occupy a space having a plurality of load circuits arranged therein and as it is desirable to measure all of the current used by each tenant upon a meter individual to him it becomes necessary to disconnect the several load circuits from their individual meters and to connect them upon a single meter. Again, where the several load circuits are connected onto a single meter and are arranged in the space occupied by a single tenant it may become necessary because such tenant relinquishes to another a part of the space used by him, to disconnect one or more of the load circuits from said meter and connect it or them with one or more additional meters.

In large buildings it is constantly occurring that a number of rooms, or a number of load circuits theretofore used by a single tenant, is divided among a number of tenants, and that a number of load circuits theretofore used by a number of tenants or users are taken over by a single user. In the first instance it becomes necessary to disconnect certain of the circuits from one meter and connect them with several independent meters. In the second instance it may be desirable to discard a number of the meters and to connect the circuits so combined with one or more meters. In either contingency under the practice prevailing prior to the introduction of my invention considerable work is entailed in making the necessary changes.

The present invention aims to provide a device or apparatus which is installed at the time a building is wired, and is constructed originally to provide for the probable maximum number of meters for independent users, and the probable maximum number of load or translating circuits, and is adapted to be quickly altered for various appropriations of floor or office space to different users.

My invention is clearly pointed out in the appended claims and may be embodied in several forms of apparatus differing in details of construction from one another. A preferred embodiment is illustrated in the accompanying drawings in which:

Figure 1 is a face view of a panel board made in accordance with my invention. Fig. 2 is a rear view thereof, the meters and connections thereto being shown diagrammatically. Fig. 3 is an enlarged transverse section of the board. Fig. 4 illustrates diagrammatically the wiring connecting said board with the meters and a number of translating circuits.

In the exemplification of my invention, shown in the drawings. A designates the panel board proper made of suitable insulating material as slate.

*a a¹* designate binding posts for the feed wires 1 and 2 which posts extend through the plate and are provided on the lower surface thereof with sockets *a² a³* to receive the feed wires.

B designates, as a whole, a double pole switch of familiar type, the poles at the hinged sides of which are electrically connected with the binding screws *a a¹*. The spring terminals *b* receiving the swinging blades *b¹* of said switch are formed on bars B¹ B² which are affixed to the front face of the board A. The supply bar B¹ is on the positive side and the return bar B² on the negative side. The bar $B^1$ is connected by means of short bolts $b^2$ $b^2$, which extend through the bar and plate, with sockets $b^3$ on the rear face of the plate with which are connected the wires 3 that lead to the meters C $C^1$ $C^2$ (Figs. 1 and 4). The return or negative bar $B^2$ of said switch is connected by means of a post $b^4$ extending therethrough and through the board with a short strip or bar $b^5$ upon which are mounted sockets $b^6$ with which are connected wires 4 leading also to the meters C $C^1$ $C^2$. The wires 3 and 4 thus connected with the meters and switch establish circuits for the current which operates the meters, and the wires 4 constitute parts of the circuits in which are included the meters and translating devices as will more fully hereinafter appear.

D, E, F and G designate bus bars which are attached side by side in any suitable manner to the rear face of the panel board. In the present instance, three meters and three bus bars E, F and G are shown. The fourth bus bar D is not connected with a meter and may be termed the house bus bar. That is to say, the current used in lamp or other translating circuits connected with the bus bar D is charged to the house. The said meter bus bars E, F and G are connected with the meters C, $C^1$ $C^2$ by means of conductor bars $E^1$ $F^1$ $G^1$ attached to the bus bars and provided at their ends with sockets $e$ $f$ $g$ to receive wires 5, 6 and 7 leading to the meters (Figs. 1 and 4). The house bus bar D is connected with the bar $B^1$ by means of a short conductor bar $D^1$ attached to the house bus bar and a pin $d$ extending through said bar $D^1$ and into the said bar $B^1$ of the switch.

H, H designate conductors or bus bars which are designed to be electrically connected to corresponding sides of the consumption or load circuits J. The bus bars H, H, which may hereinafter be called users' bus bars are fixed on the front face in crossed relation to the meter bus bars on the other side of said board. The users' bus bars and meter bus bars are provided at their points of intersection with alined holes located at the ends of holes in the board, as more clearly shown in Fig. 3, and said intersecting bus bars are adapted to be electrically connected by any suitable means as for example the plugs $h^1$ extending into the sockets formed by the alined holes or openings in the bus bars and the board A, as shown in Fig. 3. Said plugs, as herein shown, have the form of pins which are screw-threaded at their inner ends and engage screw-threads in the holes of the meter bus bars. The heads of the pins are slotted to receive a screw-driver whereby the plugs may be readily removed from and inserted into said sockets. Said transverse bars H terminate in split terminals $h^2$ which are arranged in pairs with other split terminals $i$ that extend through the board and are attached at the rear side thereof to a bus bar I that is affixed to the panel by said terminals. The bus bar I and terminals $i$ constitute the negative or return connections for the consumption, load or translating circuits J. Arranged opposite to each pair of terminals $h^2$ $i$ are the positive and negative terminals $j$ $j^1$ of translating circuits J. The opposing pairs of terminals $h^2$ $i$ and $j$ $j^1$ are bridged by suitable switches K which are shown as provided with fuse coils. But one switch K, provided with a fuse coil, is shown in Fig. 1, but it will be understood that when the device is operated at its full capacity each two opposing terminals $h^2$ $i$ and $j$ $j^1$ are bridged across by one of said switches. These terminals may be any familiar form of spring contact clips and the switches K may be provided with any suitable knife bars to enter between and contact with said spring clips. The bus bar I is connected by a spanner bar $I^1$ with the negative or return bar $B^2$.

In Fig. 4, parts of the circuits, which are shown in their mechanical form in Figs. 1, 2 and 3, are reduced to conventional diagrammatic representations, the bus bars, switch bars and their connections being shown in said Fig. 4 as having the form of lines.

In the diagram shown in Fig. 4 but seven translating circuits are shown, being one-half of the capacity of the board shown in Figs. 1, 2 and 3. Six of said circuits are metered, while the seventh translating circuit is in circuit with the house bus bar and is not metered. With the lay-out herein shown it is to be understood that the current is metered outside the several branch circuits (the line wire or house meter not being herein shown) so that the difference between the reading of the house meter and that of the meters C $C^1$ $C^2$ of the several independent users will indicate the amount of current used by the house. If desired, instead of employing a meter in circuit with the feed wires 1 and 2, the house bus bar D may be connected with a meter as are the bus bars E F and G, so that all the current used by translating devices in circuit with the bus bar D will be shown on such latter meter. The meter operating circuit is established through the wires 3 and 4 connecting the feed and return wires, respectively, with the meters. The circuit over which passes the current for the translating circuits J may be traced through the wires 3 leading from the positive side of the switch B to the meters, the wires 5, 6 and 7, the meter bus bars D E F and G, the users' bus bars H, the connections thereof to the positive sides of the circuits J, from the negative sides of the circuits J to the negative bus bar I and from thence to the negative side of the switch B. In the diagram shown in Fig. 4, the plugs $h^1$ are indicated by black circles and they indicate with which of the translating circuits J each meter is in circuit. The sockets into which said plugs are inserted are indicated by $h$. It will be seen from said diagram that the meter C is in circuit with the third and sixth translating circuits J, the meter $C^1$ is in circuit with the second and seventh translating circuits, the meter $C^2$ is in circuit with the first and fourth translating circuits, and the fifth translating circuit is in circuit with the house bus bar D. It may be assumed that Fig. 4 illustrates diagrammatically seven lamp circuits of a lighting system for seven different rooms or suites of an office building. In said diagram the first, second and third circuits, reading from the left hand side of the diagram, are shown as independently metered, one by each of the meters C $C^1$ $C^2$. If it be assumed that the conditions are such that it is desired to meter said first, second and third circuits by meter C, the plugs $h^1$ in said diagram connecting their associated users' bus bars with the meter bus bars F and E are removed and inserted in the sockets $h$ associated with the meter bus bar G or that in circuit with the meter C. Similarly, if it be desired to transfer one of the translating circuits J which is shown in Fig. 4 in circuit with one of the meters C $C^1$ $C^2$, as a house translating circuit, the plug $h^1$ associated with the users' bus bar H of that circuit will be removed and inserted into the socket of said bar associated with the house bus bar D, whereupon the current consumed in said circuit will be charged to the house.

From the foregoing examples of the manner of transferring the translating circuits from one or more meters to another and of transferring said circuits from the meter bus bars to the house bus bar, it will be obvious that any combination of circuits may be transferred to one or more of the meters or to the house bus bar and that such act of transferring a circuit to either of the meters or to the house bus bar involves merely the removal of the plugs $h^1$ associated with said circuits and the insertion thereof into the sockets associated with the meters by which it is desired to measure the current flowing through said transferred circuit. It is obvious that such means of transferring the translating circuits from one meter to the other may be quickly accomplished and without the necessity of disturbing the wiring of the distributing circuits.

As before stated there are a number of bus bars associated with each board equal to the probable maximum number of meters and independent users of current, and the number of translating circuits is equal to the number of users' bus bars H associated with said meter bus bars. It will, therefore, be noted, that the panel board may be lengthened or widened indefinitely, within practical limits, to provide for a greater or less number of meters and a greater or less number of translating circuits. The translating circuits J may represent the several circuits of a portion or the entire floor of an office building, or may represent the several floors of a factory building, or the several buildings of a group of buildings supplied from a single current generating plant. In the latter event the circuits designated herein by the letter J would represent the feed wires leading to the several buildings, and each building may in addition be equipped with a panel board and a number of meters operating in each building as does the construction herein illustrated and described.

It will be understood, of course, that the switch B may be dispensed with and the feed and return wires 1 and 2 be connected directly with the main supply and return bars $B^1$ $B^2$. It will also be understood that while I have shown the users' and the meter bus bars positioned upon opposite sides of a panel A, the panel being of insulating material, I do not intend that my invention shall be limited (except in the specific claims drawn to that construction) to such details, since it is manifest that the only requirement of the invention in this particular is that said bus bars shall be normally at "break" distance and adapted for electrical contact with each other. Hence in the claims that follow I desire the phrase "users' bars normally insulated from the meter bars" to be understood to cover any arrangement, whether by a panel of insulating material, as A, or otherwise, whereby the said bars are normally out of but adapted for electrical contact with each other.

It is to be understood that the scheme of wiring the several circuits and the arrangement of the bus bars or conductors may be changed from that herein shown, and that other variations may be made in the details of construction and arrangement within the scope of the invention, as pointed out in the appended claims attached hereto.

I claim as my invention:—

1. A metering panel board comprising a base of insulating material, main feed wire terminals mounted thereon, a plurality of sets of meter circuit terminals also mounted on the base, a plurality of sets of load circuit terminals mounted on the base; a conductor electrically connecting one member of each set of load circuit terminals to one of the feed wire terminals, a second conductor connecting a second feed wire terminal with one member of each set of meter circuit terminals, and means for connecting one or more of the remaining load circuit terminals to a second terminal of any one of the sets of meter circuit terminals.

2. A metering panel board comprising a base of insulating material, main feed wire terminals mounted thereon, a plurality of sets of meter circuit terminals also mounted on the base, a plurality of sets of load circuit terminals mounted on the base, a conductor electrically connecting one member of each set of load circuit terminals to one of the feed wire terminals, a second conductor connecting a second feed wire terminal with one member of each set of meter circuit terminals, and means for connecting one or more of the remaining load circuit terminals to a second terminal of any one of the sets of meter circuit terminals, said means including a conductor between the last-named meter and load circuit terminals comprising a part extending through the base.

3. A metering panel board comprising a base of insulating material, main feed wire terminals mounted thereon, a plurality of sets of meter circuit terminals also mounted on the base, a plurality of sets of load circuit terminals mounted on the base, a conductor electrically connecting one member of each set of load circuit terminals to one of the feed wire terminals, a second conductor connecting a second feed wire terminal with one member of each set of meter circuit terminals and means for connecting any one of the other meter circuit terminals to one or more of the other load circuit terminals, said means including a permanent bar and a movable connecting device.

4. In a metering electrical distribution system, a support, a plurality of meters, main meter circuits, a plurality of load circuits, main feed wires, a shunt connection between each meter and one of such wires, a connection between one side of each main meter circuit and one of the feed wires and between one side of each load circuit and another feed wire, and means for establishing detachable electrical connection between the remaining side of any one of the main meter circuits and the remaining side or sides of any one or more of the load circuits, comprising a conductor permanently mounted on the support and individual to each of said remaining sides of the load circuits, a conductor permanently mounted on the support and individual to the remaining side of each of the meter circuits and devices for detachably connecting such conductors of the load circuits to the conductors of the meter circuits, substantially as described.

5. A metering panel board comprising a base of insulating material, main feed wire terminals mounted thereon, a plurality of sets of meter circuit terminals also mounted on the base, a plurality of sets of load circuit terminals mounted on the base, a conductor electrically connecting one member of each set of load circuit terminals to one of the feed wire terminals, a second conductor connecting a second feed wire terminal with one member of each set of meter circuit terminals, and means for connecting one or more of the remaining load circuit terminals to a second terminal of any one of the sets of meter circuit terminals, said means including bars constituting a permanent part of the panel board and disposed in parallel relation to one another and in proximity to the middle portion of the base, and devices independent of said bars and designed to detachably engage the same.

6. In an electric current distributing system, the combination with the main feed and return wires, a plurality of translating circuits and a plurality of meters in circuit with the feed and return wires, of a plurality of meter bus-bars severally in circuit with the meters, a plurality of users' bus-bars each in circuit with one side only of one of the translating circuits and disposed in cross-wise relation to the meter bus-bars and means located at the intersection of said meter and users' bus-bars for establishing electrical connection between said bars.

7. In an electric current distributing system, the combination with feed and return wires, a plurality of translating circuits, a plurality of meters, the latter in circuit with said feed and return wires, of a plurality of meter bus bars, a wire connecting each meter with one of said bars, a plurality of users' bus bars disposed in cross-wise relation to the meter bus bars and each adapted for electrical connection with one side of one of the translating circuits, means for establishing electrical connection between the other sides of said translating circuits and the main return wire, and means located at the intersection of the users' and meter bus bars for establishing electrical connection between said bars.

8. In a system of electric current distribution, the combination with main feed and return wires, a plurality of meters and a plurality of translating circuits, said meters being in circuit with the feed and return wires to establish operating circuits, of a plurality of meter bus bars arranged side by side and each in electrical communication with one of the meters, a plurality of users' bus bars disposed in crosswise relation to the meter bus bars, and each in circuit with one side of one of the translating circuits, means establishing communication between the other side of the translating circuit and the main return wire, and means located at the intersection of said meter bus bars and users' bus bars for establishing electrical connection between said bars.

9. A panel board for electric current distributing systems, comprising a plate or board made of insulating material, a plurality of meter bus bars arranged side by side on one face of the board, a plurality of users' bus bars arranged on the other side of said board in cross-wise relation to the meter bus bars, a feed and return wire switch, terminals connected with both sides of said switch and adapted for connection with meter wires, terminals connected with the meter bus bars adapted for connection also with meter wires, terminals on said users' bus bars associated in pairs with return terminals adapted for connection with translating circuit terminals by a switch, a bus bar connecting said return terminals, and itself connected with the return side of said feed and return wire switch.

10. The combination with a main supply and a return wire, a plurality of meters, and a plurality of translating circuits, of a panel board made of insulating material, a plurality of meter bars arranged on one side thereof, each electrically connected with one of said meters, a plurality of users' bus bars on the other side of said board and disposed in cross-wise relation to said meter bus bars and adapted for electrical connection with said translating circuits, said bus bars and meter bars being provided at their points of intersection with openings arranged in line with the openings in said board and constituting sockets, and plugs adapted to enter said sockets.

11. A system of electrical power distribution including meter circuits each having one side connected to a supply main and the other side to a conductor; consumption circuits each having one side connected to another of the supply mains and the other side to a conductor crossing the said conductors belonging to the meter circuits; and means for connecting any one of the said meter conductors with any one of the said consumption conductors.

12. A system of electrical power distribution including meter circuits, one terminal of each being connected to a supply main; consumption circuits, one terminal of each being connected to another supply main of different potential from the first; and conductors, one for each of the remaining terminals of the meter circuits and consumption circuits, each of said meter circuit conductors crossing and being adapted to be connected to each of the said consumption circuit conductors.

13. A system of electrical power distribution including a panel board; meter circuits, one terminal of each being connected to a supply main; consumption circuits, one terminal of each being connected to another supply main of different potential from the first; and conductors, one for each of the remaining terminals of the meter circuits and consumption circuits, said meter circuit conductors being on opposite sides of the board from the consumption circuit conductors, and said meter circuit conductors crossing each of said consumption circuit conductors; and means for plugging through the board from any of said conductors on one side thereof to any of said conductors on the other side thereof.

14. As an article of manufacture, a panel board for electrical power distribution consisting of a board of insulating material, bus bars, meter circuit terminals and consumption circuit terminals mounted on said board, one of each pair of said terminals being associated with a bus bar, the meter circuit terminals and consumption circuit terminals being associated with different bus bars; conductors mounted on said board, each being associated with one of the remaining meter circuit terminals; other conductors on the opposite side of the board and arranged at an angle to the first, said last mentioned conductors each being associated with one of the remaining consumption circuit terminals; and said board being apertured at the intersections of the said conductors for receiving a plug for electrically connecting them.

15. In a panel board for electrical power distribution, the combination with an insulating body, of two sets of conductors running transversely to each other on opposite sides of said insulating body, said insulating body being apertured for permitting a conducting piece to pass through it to connect any one of the conductors on one side of said insulating body with any one of the conductors on the other side of said insulating body; supply mains mounted on said insulating body; means for electrically connecting one of said supply mains to one set of said transverse conductors, and other means for electrically connecting another of said supply mains to another set of said transverse conductors.

16. A panel board for electrical power distribution having supply mains, two sets of conductors running transversely to each other, the different sets being in different, superposed but separated parallel planes; said transverse conductors being adapted to be electrically connected at their points of intersection; means for electrically connecting one of said supply mains to one set of said transverse conductors, and other means for electrically connecting another of said supply mains to another set of said transverse conductors.

17. A panel board for electrical power distribution having supply mains; two sets of conductors running transversely to each other, the different sets being in different, superposed but separated parallel planes; means for plugging through from a conductor in one set to any one of the conductors crossing it in another set; means for electrically connecting one of said supply mains to one set of said transverse conductors, and other means for electrically connecting another of said supply mains to another set of said transverse conductors.

18. A panel board for electrical power distribution having supply mains; two sets of conductors running transversely to each other, the different sets being in different superposed but separated parallel planes; means for plugging through from a transverse conductors in one set to any one of the conductors crossing it in another set; means including meters for electrically connecting one of said supply mains to one set of said transverse conductors; and other means including lamps for electrically connecting another of said supply mains to another set of said transverse conductors.

In testimony, that I claim the foregoing as my invention I affix my signature in presence of two witnesses, this 2nd day of August A. D. 1905.

FREDERICK F. SKEEL.

Witnesses:
 TAYLOR E. BROWN,
 GEO. R. WILKINS.